United States Patent
Zhou et al.

(10) Patent No.: US 10,190,948 B2
(45) Date of Patent: Jan. 29, 2019

(54) TYPE OF MULTI-NOZZLE COMBINED ATOMIZING DUST SUPPRESSION EXPERIMENTAL EQUIPMENT UNDER THE EFFECT OF AIRFLOW DISTURBANCE

(71) Applicant: Shandong University of Science and Technology, Qingdao (CN)

(72) Inventors: Gang Zhou, Qingdao (CN); Qi Zhang, Qingdao (CN); Ruonan Bai, Qingdao (CN); Weimin Cheng, Qingdao (CN); Wen Nie, Qingdao (CN); Jiao Xue, Qingdao (CN); Han Qiu, Qingdao (CN); Tao Fan, Qingdao (CN); Mao Xu, Qingdao (CN); Cong Chen, Qingdao (CN)

(73) Assignee: SHANGDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 297 days.

(21) Appl. No.: 15/381,878

(22) Filed: Dec. 16, 2016

(65) Prior Publication Data

US 2017/0322121 A1 Nov. 9, 2017
US 2018/0052079 A9 Feb. 22, 2018

(30) Foreign Application Priority Data

Jan. 20, 2016 (CN) .......................... 2016 1 0037761

(51) Int. Cl.
*G01M 99/00* (2011.01)
*B01D 47/06* (2006.01)

(52) U.S. Cl.
CPC .......... *G01M 99/008* (2013.01); *B01D 47/06* (2013.01)

(58) Field of Classification Search
USPC ........................................ 73/118.01
See application file for complete search history.

(56) References Cited

U.S. PATENT DOCUMENTS 3,743,360 A * 7/1973 Brevko .................... G01N 1/04
141/392
4,417,992 A * 11/1983 Bhattacharyya ........ B09B 1/004
252/88.1

(Continued)

*Primary Examiner* — Eric S McCall
(74) *Attorney, Agent, or Firm* — Buchanan Ingersoll & Rooney PC

(57) ABSTRACT

A multi-nozzle combined atomizing dust suppression experimental equipment under the effect of airflow disturbance includes a simulated roadway device, water spray based dust suppression device and nozzle position adjustor. The simulated roadway device includes an inlet portion, front divergent portion, simulated roadway body, rear convergent portion and outlet portion. The water spray based dust suppression device includes a dust generation and extraction system and spraying system. The dust generation and extraction system includes a dust generation device, exhaust air duct, exhaust fan and outlet air duct while the spraying system includes a water tank, high pressure water pump, confined water pipe, pressure water flow converter and multiple nozzles. The nozzle position adjustor includes a nozzle slide, slide fixing rod, nozzle sliding rack and electrically-controlled drive system which controls the change of horizontal position and vertical position of the nozzles.

10 Claims, 2 Drawing Sheets

(56) References Cited

U.S. PATENT DOCUMENTS

| | | | |
|---|---|---|---|
| 2003/0079529 A1* | 5/2003 | Leep | G01M 17/0074 |
| | | | 73/116.06 |
| 2011/0232495 A1* | 9/2011 | Hutchinson | B01D 47/06 |
| | | | 96/256 |
| 2011/0272511 A1* | 11/2011 | Hall | B02C 21/026 |
| | | | 241/101.2 |
| 2017/0091350 A1* | 3/2017 | Bauer | G06F 17/5095 |
| 2018/0243761 A1* | 8/2018 | Hashimoto | B04C 9/00 |

* cited by examiner

TYPE OF MULTI-NOZZLE COMBINED ATOMIZING DUST SUPPRESSION EXPERIMENTAL EQUIPMENT UNDER THE EFFECT OF AIRFLOW DISTURBANCE

FIELD

The present disclosure relates to a type of atomizing dust suppression experimental equipment, more specifically to a multi-nozzle combined atomizing dust suppression experimental equipment under the effect of airflow disturbance.

BACKGROUND INFORMATION

The nozzle atomizing properties and water spray based dust suppression are very important subjects of the present studies on two-phase flow and have a wide application value in agriculture, energy, safety and environmental engineering and the dust suppression effect is determined directly by the nozzle atomizing properties which are directly determined by such factors as the nozzle space position, nozzle caliber, spray pressure, spray flow, mist flow form and divergence angle of mist flow, so it is of great practical significance to study the atomizing properties and the dust-mist coupling rule of an individual nozzle under different spray parameters, especially on those atomizing properties and the dust-mist coupling rule of combination of multiple nozzles at different space positions. However, most of existing water spray based dust suppression experimental equipment is mainly used for studying an individual nozzle at a fixed position and fails to achieve automatic adjustment and change of nozzle space positions, so such equipment cannot be used to study the atomizing properties and dust suppression effects of an individual nozzle or combination of multiple nozzles at different space positions.

SUMMARY

In light of the deficiencies of the above-mentioned art, the present disclosure provides a multi-nozzle combined atomizing dust suppression experimental equipment under the effect of airflow disturbance.

In an embodiment, the multi-nozzle combined atomizing dust suppression experimental equipment under the effect of airflow disturbance comprises a simulated roadway device, water spray based dust suppression device and nozzle position adjustor; the simulated roadway device comprises an inlet portion, front divergent portion, simulated roadway body, rear convergent portion and outlet portion; the water spray based dust suppression device comprises a dust generation and extraction system and spraying system, the dust generation and extraction system comprises a dust generation device, exhaust air duct, exhaust fan and outlet air duct, the dust generation device is located at the inlet portion of the simulated roadway device, the inlet portion is connected to the atmosphere, one end of the exhaust air duct is connected to the outlet portion of the simulated roadway device and the other end of the exhaust air duct is connected to the outlet air duct via the exhaust fan; the spraying system comprises a water tank, high pressure water pump, confined water pipe, pressure water flow converter and multiple nozzles, the water tank is connected via the high pressure water pump and confined water pipe to the pressure water flow converter which is connected with multiple nozzles; the nozzle position adjustor comprises a nozzle slide, slide fixing rod, nozzle sliding rack and electrically-controlled drive system, every nozzle is mounted on a nozzle slide, all nozzle slides are mounted on a slide fixing rod which is located on the nozzle sliding rack arranged inside the simulated roadway body, a vertical slideway is located on the nozzle sliding rack and a horizontal slideway is located under the nozzle sliding rack, the electrically-controlled drive system comprises a horizontal drive system which controls the horizontal position change of the nozzle sliding rack on the horizontal slideway and a vertical drive system which controls the vertical position change of the slide fixing rod on the vertical slideway.

In another embodiment, the simulated roadway device is made in such a way that a framework is made of aluminum alloy hollow tubes and then enclosed with organic glass.

In another embodiment, the horizontal drive system comprises a first motor, a first drive gear, a first driven gear and horizontal slide belts, the rotating shaft of a first motor is connected with a first drive gear and the horizontal slide belts are placed onto a first drive gear and a first driven gear, a first motor drives the horizontal slide belts to move via a first drive gear and the horizontal slide belts are connected to the nozzle sliding rack via a first connector.

In another embodiment, there are two horizontal slide belts arranged in parallel in total, each horizontal slide belt is provided with one first drive gear and one first driven gear and a drive rod is provided between two first drive gears.

In another embodiment, the vertical drive system comprises a second motor, a second drive gear, a second driven gear and a vertical slide belt, the rotating shaft of a second motor is connected with a second drive gear and the vertical slide belt is placed onto a second drive gear and a second driven gear, a second motor drives the vertical slide belt to move via a second drive gear and the vertical slide belt is connected via a second connector to the nozzle slide bar which is connected with the slide fixing rod.

In another embodiment, two fixing blocks are provided at the bottom of the nozzle slide bar and fix the slide fixing rod, onto which the several nozzle slides are mounted, and the nozzle slides can move back and forth along the slide fixing rod under the effect of external push and pull forces.

In another embodiment, 3 to 10 nozzle slides in total are provided on the slide fixing rod.

In another embodiment, a water channel is provided inside the nozzle slide, one end of the water channel acts as the water inlet and the other end of the water channel is provided with the connecting threads that match the nozzle.

In another embodiment, the organic glass is 2 to 3 cm in thickness and the simulated roadway device is 3 m×2 m×2 m in L×W×H.

In another embodiment, the water tank is 1-1.5 $m^3$ in capacity; the high pressure water pump has a water pressure adjusting range from 0.5 MPa to 10 MPa; the dust generation device can generate dust with particle sizes of 0.5-100 μm and has a dust yield of 10-50 g/s; the exhaust fan can achieve stepless variable frequency regulation and has an air volume range from 0 $m^3$/min to 1000 $m^3$/min.

The equipment can simulate the atomizing properties (changing rules of mist droplet size, mist droplet velocity, atomizing concentration, etc.) and dust-mist coupling rule of an individual nozzle or combination of multiple nozzles under the conditions of different mist flow forms, nozzle calibers, spray pressures, divergence angles of mist flow and space positions, thus achieving the effect of efficient water spray based dust suppression through adjustment and optimization of the spray parameters, significantly reducing dust concentration and improving the working environment.

BRIEF DESCRIPTION OF THE DRAWINGS

The present invention is further described here in conjunction with the drawings and the specific embodiments.

Figure 1:
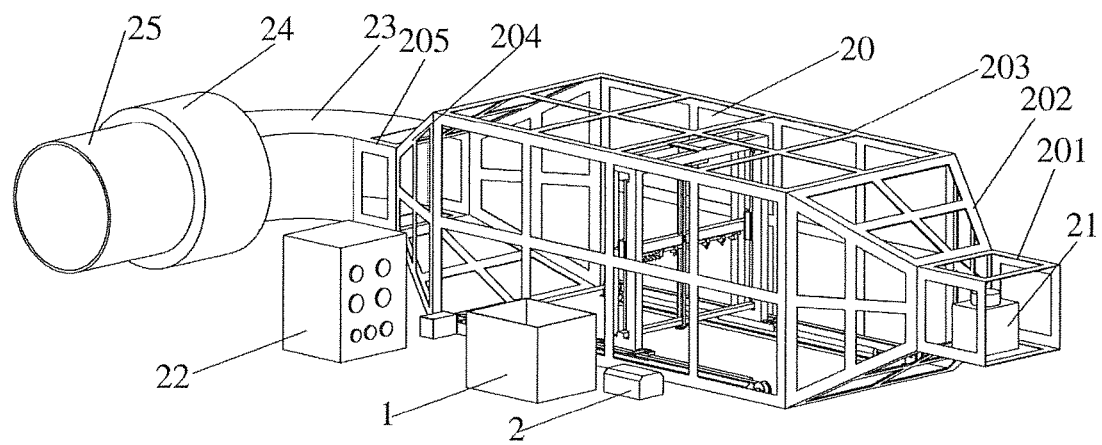
FIG. 1 illustrates a schematic view of the overall structure of multi-nozzle combined atomizing dust suppression experimental equipment under the effect of airflow disturbance of an embodiment.
Figure 2:
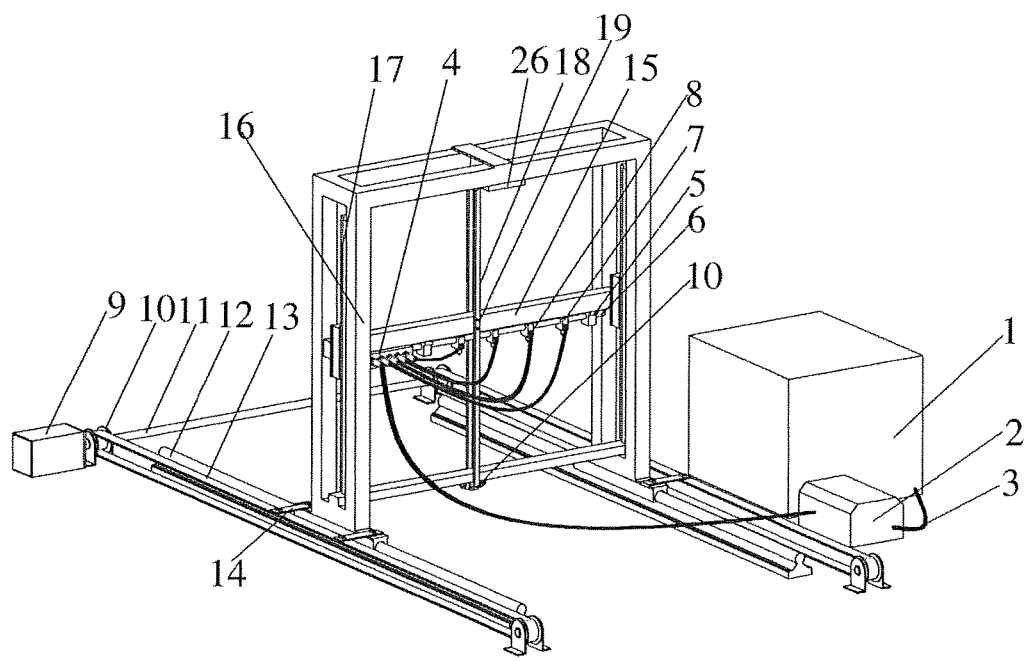
FIG. 2 illustrates a schematic view of the structure of the nozzle position adjustor of an embodiment.
Figure 3:
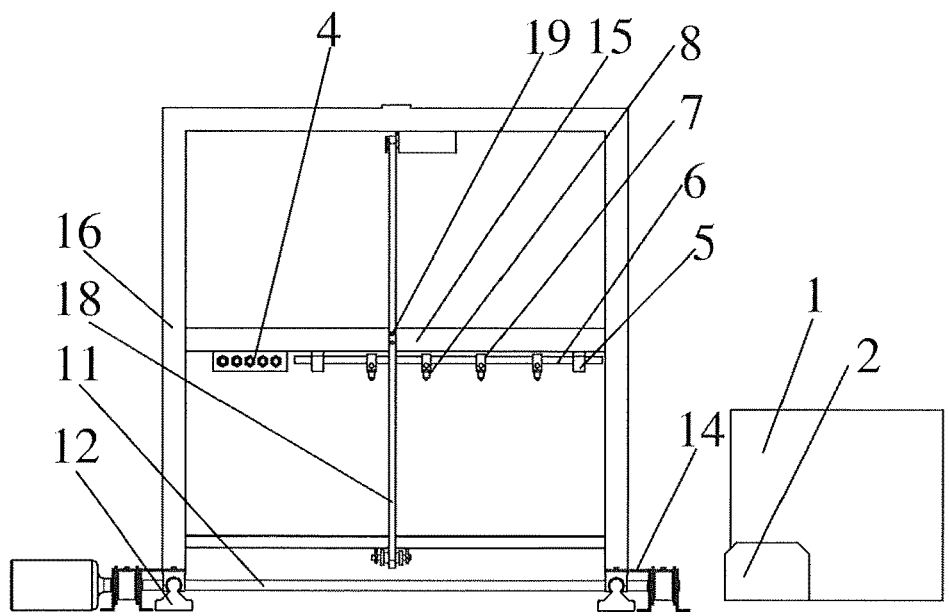
FIG. 3 illustrates a front view of FIG. 2.
Figure 4:
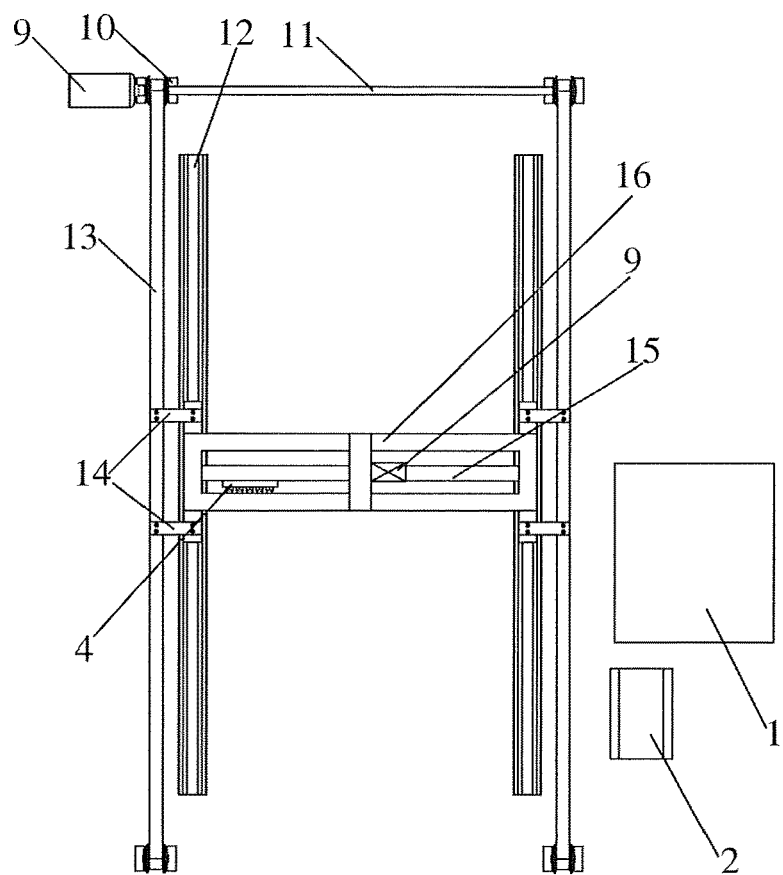
FIG. 4 illustrates a vertical view of FIG. 2.

As shown in these figures, 1—water tank, 2—high pressure water pump, 3—confined water pipe, 4—pressure water flow converter, 5—fixing block, 6—slide fixing rod, 7—nozzle slide, 8—nozzle, 9—a first motor, 10—a first drive gear, 11—drive rod, 12—horizontal slideway, 13—horizontal slide belt, 14—a first connector, 15—nozzle slide bar, 16—nozzle sliding rack, 17—vertical slideway, 18—vertical slide belt, 19—a second connector, 20—simulated roadway device, 201—inlet portion, 202—front divergent portion, 203—simulated roadway body, 204—rear convergent portion, 205—outlet portion, 21—dust generation device, 22—power cabinet, 23—exhaust air duct, 24—exhaust fan, 25—outlet air duct, 26—a second motor.

DETAILED DESCRIPTION

According to the drawings, a multi-nozzle combined atomizing dust suppression experimental equipment under the effect of airflow disturbance comprises a simulated roadway device, water spray based dust suppression device and nozzle position adjustor. The simulated roadway device 20 comprises the following five parts: inlet portion 201, front divergent portion 202, simulated roadway body 203, rear convergent portion 204 and outlet portion 205. The simulated roadway device 20 is made in such a way that a framework is made of aluminum alloy hollow tubes and then enclosed with organic glass so that the external airflow will not affect the experiment. The organic glass is 2 cm in thickness and the overall simulated roadway device is 3 m×2 m×2 m in L×W×H. The water spray based dust suppression device comprises a dust generation and extraction system and spraying system, the dust generation and extraction system comprises a dust generation device 21, exhaust air duct 23, exhaust fan 24 and outlet air duct 25. The dust generation device 21 is located at the inlet portion of the simulated roadway device, the inlet portion is connected to the atmosphere, the dust generation device can generate dust with particle sizes of 0.5-100 µm, has a dust yield of 10-50 g/s and serves as a dust source for the dust-mist coupling experiment. One end of the exhaust air duct 23 is connected to the outlet portion of the simulated roadway device and the other end of the exhaust air duct 23 is connected to the outlet air duct 25 via the exhaust fan 24. Negative-pressure ventilation is generated in the simulated roadway device 20 by starting the exhaust fan 24, thus providing the airflow conditions for spraying and dust suppression experiment. The spraying system comprises a water tank 1, high pressure water pump 2, confined water pipe 3, pressure water flow converter 4 and multiple nozzles 8, the water tank 1, high pressure water pump 2 and pressure water flow converter 4 are connected to the confined water pipe 3 in sequence and the pressure water flow converter 4 is connected to multiple nozzles 8 via several confined water pipes. The pressure water flow converter 4 can split the incoming water under specific pressure into several streams which run to several confined water pipes, thus achieving simultaneous operation of multiple nozzles. The water tank 1 is 1-1.5 m³ in capacity and the high pressure water pump 2 has a water pressure adjusting range from 0.5 MPa to 10 MPa. The nozzle position adjustor comprises a nozzle slide 7, slide fixing rod 6, nozzle sliding rack 16 and electrically-controlled drive system. Every nozzle 8 is mounted on a nozzle slide 7, all nozzle slides 7 are mounted on a slide fixing rod 6 which is located on the nozzle sliding rack 16 arranged inside the simulated roadway body. A vertical slideway 17 is located on the nozzle sliding rack and a horizontal slideway 12 is located under the nozzle sliding rack. The electrically-controlled drive system comprises a horizontal drive system which controls the horizontal position change of the nozzle sliding rack on the horizontal slideway 12 and a vertical drive system which controls the vertical position change of the slide fixing rod 6 on the vertical slideway 17.

As a further embodiment, the horizontal drive system comprises a first motor 9, a first drive gear 10, a first driven gear and horizontal slide belts 13, the rotating shaft of a first motor 9 is connected with a first drive gear and the horizontal slide belts 13 are placed onto a first drive gear and a first driven gear, and a first drive gear is connected to the horizontal slide belts 13 via the saw-tooth structure. A first motor 9 drives the horizontal slide belts 13 to move via a first drive gear and the horizontal slide belts 13 are connected to the nozzle sliding rack 16 via a first connector 14. There are two horizontal slide belts 13 arranged in parallel in total, each horizontal slide belt is provided with one first drive gear and one first driven gear and a drive rod 11 is provided between two first drive gears. The vertical drive system comprises a second motor 26, a second drive gear, a second driven gear and a vertical slide belt 18, the rotating shaft of a second motor 26 is connected with a second drive gear and the vertical slide belt 18 is placed onto a second drive gear and a second driven gear, a second motor drives the vertical slide belt 18 to move via the saw-tooth structure, a second motor 26 drives the vertical slide belt 18 to move via a second drive gear and the vertical slide belt 18 is connected to the nozzle slide bar 15 via a second connector 19, two fixing blocks 5 are provided at the bottom of the nozzle slide bar 15 and fix the slide fixing rod 6. The nozzle slides 7 can move back and forth along the slide fixing rod 6 under the effect of external push and pull forces, namely, the nozzle slides 7 can be manually adjusted leftward or rightward on the slide fixing rod 6, and in conjunction with the nozzle position adjustor, achieve the three-dimensional space change of the position of the nozzle 8.

Furthermore, 3 to 10 nozzle slides 7 in total are provided on the slide fixing rod 6. A water channel is provided inside the nozzle slide 7, one end of the water channel acts as the water inlet and the other end of the water channel is threaded and located at the bottom of the nozzle slide 7 and allows installation of different sizes of nozzles 8.

Furthermore, the exhaust fan 24, a first motor 9 and a second motor 26 are connected to the power cabinet 22. The exhaust fan 24 is controlled by the power cabinet, can achieve stepless variable frequency regulation and generate airflows at different air velocities in the an air volume range from 0 m³/min to 1000 m³/min so as to study the atomizing properties of the mist droplet field, air-mist coupling rule and dust-mist coupling rule under different airflow conditions. A first motor 9 is controlled by the power cabinet 22 and enables the nozzle sliding rack 16 to make horizontal movement on the horizontal slideway 12 and a second motor 26 is controlled by the power cabinet 22 and enables the nozzle slide bar 15 to make vertical movement on the vertical slideway 17.

Furthermore, in order to prevent the nozzle sliding rack 16 from moving out of the horizontal slideway 12, which may causes harm, contacts may be mounted at both ends of the horizontal slideway 12 so that the nozzle sliding rack 16 moves reversely automatically after it touches the contacts.

The nozzles may be mounted on the nozzle slides as per the type and quantity of the nozzles which are determined according to the experiment requirements and the unused nozzle slides shall be blocked with nozzle plugs. The horizontal slide belt has a length of 1.5 to 3 m, which may be adjusted according to the experimental requirements. The vertical slide belt is mounted at the middle of the nozzle sliding rack and its length is determined by the size of the nozzle sliding rack. Two feet are provided at both sides of the bottom of the nozzle sliding rack and tightly connected with the horizontal slideway so as to achieve movement. The two horizontal slideways fit tightly over the inside of the two horizontal slide belts and have a spacing consistent with the width of the nozzle sliding rack, the nozzle sliding rack, driven by the horizontal slide belt, moves horizontally on the horizontal slideway and the horizontal slideway is slightly less in length than the horizontal slide belt. The nozzle slide bar is composed of two feet and one bar body, these feet are used to achieve sliding together with the vertical slideway, one pressure water flow converter and one slide fixing rod are fixed on the bar body and several nozzle slides are mounted on the slide fixing rod.

The spraying system of the present disclosure can easily achieve the spraying field formed by an individual nozzle or combination of multiple nozzles under the conditions of different mist flow forms, nozzle calibers, spray pressures, divergence angles of mist flow and space positions, wherein the nozzle combination modes may be freely achieved by means of nozzle slides and nozzle plugs, the spray pressure may be reached through adjusting the high pressure water pump and the position of spraying field may be changed by the nozzle position adjuster.

The equipment can freely adjust and change the nozzle type, nozzle quantity, spray pressure and spraying field space position, etc., can be used to study the atomizing properties of the spraying field formed by an individual nozzle or combination of multiple nozzles under the conditions of different mist flow forms, nozzle calibers, spray pressures, divergence angles of mist flow and space positions, also to study the air-mist and dust-mist coupling rules under corresponding conditions and to explore the optimal dust-mist direct coupling relationship.

The basic working process of the present disclosure is described as follows:
To operate the equipment, firstly, the power is switched on to adjust the power cabinet 22, a first motor 9 is started and rotates to transfer the power to two horizontal slide belts 13 via a first drive gear 10 and the drive rod 11 and the power of the horizontal slide belts 13 is then transferred to the nozzle sliding rack 16 via a first connector 14 to drive the nozzle sliding rack 16 and the nozzles 8 on the nozzle sliding rack to make horizontal movement and enable the nozzles 8 to move to the experimental required horizontal position. Next, a second motor 26 is started from the power cabinet 22 and rotates to transfer the power to one vertical slide belt 18 via a second drive gear and the power of the vertical slide belt 18 is then transferred to the nozzle slide bar 15 via a second connector 19 to drive the nozzle slide bar 15 and the nozzles 8 on the nozzle slide bar to make vertical movement and enable the nozzles 8 to move to the experimental required vertical position. Then, the experimental nozzles 8 may be installed on the nozzle slide 7 and the quantity of the nozzles 8 may be selected according to the experimental requirement and the unused nozzle slides are blocked with the nozzle plugs. Next, an individual nozzle or combination of multiple nozzles moves to the experimental required position by means of manual sliding and this process achieves free change of three-dimensional space positions of a nozzle or combination of multiple nozzles.

To study the atomizing properties of spraying, the high pressure water pump 2 is adjusted to pump water from the water tank to the pressure water flow converter 4 under certain pressure, the water for spraying is split, without pressure change, by the pressure water flow converter 4 into streams which run to 1 to 4 confined water pipes 3 directly connected with the nozzle slide 7 and the pressure water flow finally passes through the nozzle slide 7 and sprays from the experimental nozzle 8 in a form of an individual nozzle or combination of multiple nozzles to form a spraying field so as to study the atomizing properties of the spraying field formed by an individual nozzle or combination of multiple nozzles under the conditions of different mist flow forms, nozzle calibers, spray pressures, divergence angles of mist flow and space positions.

To study the air-mist coupling rule, immediately after completion of the above-mentioned steps, the exhaust fan 24 is started from the power cabinet 22 to generate negative-pressure ventilation and is regulated to the experimental required air velocity, which enables the airflow to pass through the simulated roadway device 20 and influences the atomizing properties of the spraying field so that the air-mist coupling rule of corresponding spraying field is studied by means of corresponding mist droplet diameter-velocity-concentration measuring instrument.

To study the dust-mist coupling rule, immediately after completion of the above-mentioned steps, the dust generation device 21 is started to generate dust which passes through the front divergent portion 202 where it moves and spreads, then runs into the simulated roadway body 203 under the effect of airflow, goes through the spraying field formed by the spraying system and is coupled with the mist-droplet field and settles, so as to study the dust-mist coupling rule under the conditions of different air velocities, spray parameters and generated dust flow rates and the optimal particle size of the dust captured by mist droplets under corresponding conditions.

In summary, the equipment has a simple and reliable structure, can easily achieve the combination of different types of nozzles and their free change at three-dimensional space positions, provides convenience for studying the atomizing properties of the spraying field formed by an individual nozzle or combination of multiple nozzles under the conditions of different mist flow forms, nozzle calibers, spray pressures, divergence angles of mist flow and space positions and also for studying the air-mist and dust-mist coupling rules under corresponding conditions.

The multi-nozzle combined atomizing dust suppression experimental equipment under the effect of airflow disturbance provided by the present disclosure is only a specific embodiment of the present invention but the scope of the present invention is not limited thereto, and any changes or alternatives that can be easily designed by any technicians of this field in the technical scope disclosed by the present disclosure shall be included in the protection scope of the present invention.

What is claimed is:

1. A multi-nozzle combined atomizing dust suppression experimental equipment under an effect of airflow disturbance, wherein the equipment comprises a simulated roadway device, water spray based dust suppression device and nozzle position adjustor;

the simulated roadway device comprises an inlet portion, front divergent portion, simulated roadway body, rear convergent portion and outlet portion;

the water spray based dust suppression device comprises a dust generation and extraction system and spraying system, the dust generation and extraction system comprises a dust generation device, exhaust air duct, exhaust fan and outlet air duct, the dust generation device is located at an inlet portion of the simulated roadway device, the inlet portion is connected to the atmosphere, one end of the exhaust air duct is connected to an outlet portion of the simulated roadway device and the other end of the exhaust air duct is connected to the outlet air duct via the exhaust fan;

the spraying system comprises a water tank, high pressure water pump, confined water pipe, pressure water flow converter and multiple nozzles, the water tank is connected via the high pressure water pump and confined water pipe to the pressure water flow converter which is connected with multiple nozzles;

the nozzle position adjustor comprises a nozzle slide, slide fixing rod, nozzle sliding rack and electrically-controlled drive system, every nozzle is mounted on the nozzle slide, all nozzle slides are mounted on the slide fixing rod which is located on the nozzle sliding rack arranged inside the simulated roadway body, a vertical slideway is located on the nozzle sliding rack and a horizontal slideway is located under the nozzle sliding rack, the electrically-controlled drive system comprises a horizontal drive system which controls horizontal position change of the nozzle sliding rack on the horizontal slideway and a vertical drive system which controls vertical position change of the slide fixing rod on the vertical slideway.

2. The multi-nozzle combined atomizing dust suppression experimental equipment under the effect of airflow disturbance according to claim 1, wherein the simulated roadway device is made in such a way that a framework is made of aluminum alloy hollow tubes and then enclosed with organic glass.

3. The multi-nozzle combined atomizing dust suppression experimental equipment under the effect of airflow disturbance according to claim 1, wherein the horizontal drive system comprises a first motor, a first drive gear, a first driven gear and horizontal slide belts, a rotating shaft of the first motor is connected with the first drive gear and the horizontal slide belts are placed onto the first drive gear and the first driven gear, the first motor drives the horizontal slide belts to move via the first drive gear and the horizontal slide belts are connected to the nozzle sliding rack via a first connector.

4. The multi-nozzle combined atomizing dust suppression experimental equipment under the effect of airflow disturbance according to claim 3, wherein there are two horizontal slide belts arranged in parallel in total, each horizontal slide belt is provided with one first drive gear and one first driven gear and a drive rod is provided between the two first drive gears.

5. The multi-nozzle combined atomizing dust suppression experimental equipment under the effect of airflow disturbance according to claim 1, wherein the vertical drive system comprises a second motor, a second drive gear, a second driven gear and a vertical slide belt, a rotating shaft of a second motor is connected with the second drive gear and the vertical slide belt is placed onto the second drive gear and the second driven gear, the second motor drives the vertical slide belt to move via the second drive gear and the vertical slide belt is connected via a second connector to the nozzle slide bar which is connected with the slide fixing rod.

6. The multi-nozzle combined atomizing dust suppression experimental equipment under the effect of airflow disturbance according to claim 5, wherein two fixing blocks are provided at the bottom of the nozzle slide bar and fix the slide fixing rod, onto which said several nozzle slides are mounted, and the nozzle slides can move back and forth along the slide fixing rod under the effect of external push and pull forces.

7. The multi-nozzle combined atomizing dust suppression experimental equipment under the effect of airflow disturbance according to claim 1, wherein 3 to 10 nozzle slides in total are provided on the slide fixing rod.

8. The multi-nozzle combined atomizing dust suppression experimental equipment under the effect of airflow disturbance according to claim 1, wherein a water channel is provided inside the nozzle slide, one end of the water channel acts as the water inlet and the other end of the water channel is provided with connecting threads that match the nozzle.

9. The multi-nozzle combined atomizing dust suppression experimental equipment under the effect of airflow disturbance according to claim 2, wherein the organic glass is 2 to 3 cm in thickness and the simulated roadway device is 3 m×2 m×2 m in L×W×H.

10. The multi-nozzle combined atomizing dust suppression experimental equipment under the effect of airflow disturbance according to claim 1, wherein the water tank is 1-1.5 $m^3$ in capacity; the high pressure water pump has a water pressure adjusting range from 0.5 MPa to 10 MPa; the dust generation device is configured to generate dust with particle sizes of 0.5-100 μm and has a dust yield of 10-50 g/s; the exhaust fan achieves stepless variable frequency regulation and has an air volume range from 0 $m^3$/min to 1000 $m^3$/min.

* * * * *